United States Patent
Schöner et al.

[11] Patent Number: 5,788,023
[45] Date of Patent: Aug. 4, 1998

[54] BRAKE ACTUATOR FOR AN ELECTRICALLY ACTUABLE VEHICLE BRAKE

[75] Inventors: Hans-Peter Schöner, Frankfurt; Friedhelm Bergmann, Bad Pyrmont; Thomas Dieckmann, Pattensen; Hubertus Prinzler, Langenhagen, all of Germany

[73] Assignees: Continental Aktiengesellschaft, Hanover; Daimeler-Benz Aktiengesellscgaft, Stuttgart-Mohringen, both of Germany

[21] Appl. No.: 649,233

[22] Filed: May 17, 1996

[30] Foreign Application Priority Data

May 19, 1995 [DE] Germany ............. 195 18 412.2
Nov. 18, 1995 [DE] Germany ............. 195 43 098.0

[51] Int. Cl.⁶ ..................................... F16D 55/08
[52] U.S. Cl. .................. 188/72.7; 188/72.8; 188/158
[58] Field of Search .................. 188/71.7, 72.3, 188/72.6, 72.7, 72.8, 158, 162, 196 A, 196 D, 196 V; 192/18 B, 12 D, 84.1, 84.5, 84.6, 111 R, 111 A, 111 B

[56] References Cited

U.S. PATENT DOCUMENTS

| | | |
|---|---|---|
| 4,037,893 | 7/1977 | Perrin . |
| 4,658,939 | 4/1987 | Kircher et al. . |
| 4,793,447 | 12/1988 | Taig et al. ............. 188/72.8 X |
| 4,865,162 | 9/1989 | Morris et al. ............. 188/72.8 |
| 4,926,708 | 5/1990 | Dietrich et al. . |
| 5,628,387 | 5/1997 | Schantzen ............. 188/72.8 X |

FOREIGN PATENT DOCUMENTS

| | | |
|---|---|---|
| 3410006 | 9/1985 | Germany . |
| 4229042 | 3/1993 | Germany . |

*Primary Examiner*—Robert J. Oberleitner
*Assistant Examiner*—Tyrone M. Lee
*Attorney, Agent, or Firm*—Walter Ottesen

[57] ABSTRACT

A brake actuator for electrically actuated vehicle brakes includes a spindle assembly without additional gear stages. The forces required for engaging the brake are realized herein by utilizing the spindle assembly. The brake actuator includes a brake pad which is pressed against a brake disc with the aid of an electric motor (4) operating as an electric drive. A planetary-roller spindle assembly operatively connects the electric motor to a brake piston on which the brake pad is mounted. The electric motor (4) is connected via the spindle assembly to the brake piston (32). The spindle assembly (16) is arranged in the displacement direction of the brake pad and the brake piston (32) is journalled so as to be axially displaceable with the brake pad. The spindle assembly (16) includes a spindle rod (18) which is mounted so as to be an extension of the rotor (8) of the electric motor (4). The brake piston (32) is mounted so that it is held against rotation and is formed to define a unit with the spindle nut (20) of the spindle assembly (16). Alternatively, the rotor (8) of the electric motor (4) can be fixedly attached to the spindle nut (20) so that the spindle nut rotates with the rotor. The rotor then has a hollow cavity for accommodating the spindle rod (18') therein.

7 Claims, 3 Drawing Sheets

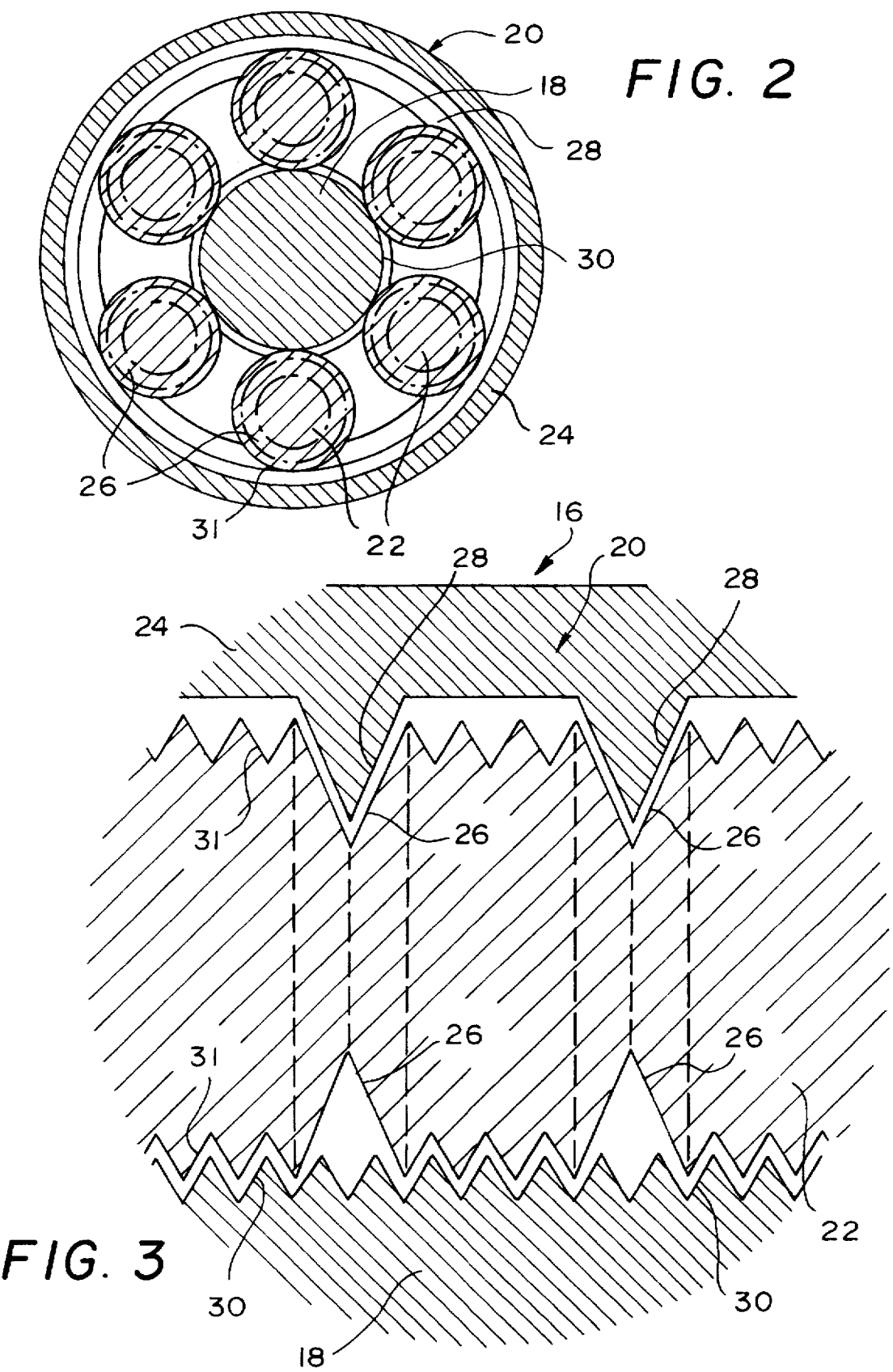

BRAKE ACTUATOR FOR AN ELECTRICALLY ACTUABLE VEHICLE BRAKE

FIELD OF THE INVENTION

The invention relates to a brake actuator for an electrically actuable vehicle brake having brake shoes which can be pressed against a brake disc with the aid of an electric motor operating as an electric drive. The electric motor is connected via a spindle to a brake piston. The spindle is mounted in the displacement direction of the brake shoe and the brake piston operates on the brake shoes and is journalled so as to be axially displaceable. The brake actuator is suitable for braking systems of the brake-by-wire type.

BACKGROUND OF THE INVENTION

German published patent application 3,410,006 discloses an arrangement for controlling a brake system which drives such a brake actuator. This brake system is characterized, inter alia, in that the electrically actuable wheel brake is configured as a disc brake having brake shoes which can be pressed against the brake disc with the aid of an electric motor operating as an electric drive. The brake system is further characterized in that the electric motor is connected to a piston via a spindle and via a planetary gear unit. The spindle is arranged in the direction of displacement of the brake shoes and the piston is journalled so as to be axially displaceable and operates on the brake shoes.

The planetary gear unit used here does have a rather low coefficient of friction. However, the bearings of the transmission cannot be selected as small as desired and yet provide an adequately large force. Practical experiments were conducted and show that the bearing size must be approximately 3 mm diameter as a minimum. This requires a pitch of the spindle of approximately 4 mm per rotation. With a pitch this high, no adequately large force translation for the braking force against the brake lining can be obtained with simple spindle drives. For this purpose, at least one additional gear stage as a rule is required.

If only a single gear stage is to be used, then an electric motor is required with a correspondingly high torque strength and therefore weight so that such a motor is expensive. Heavy electric motors of this kind also increase the unsuspended mass of the vehicle in a disadvantageous manner.

On the other hand, it has already been suggested to use a second gear stage such as a second planetary stage. Although a large-dimensioned electric motor can be avoided in this way, the brake actuator is. Then, however complicated because of the second planetary stage. This has been found to be disadvantageous because even a single stage planetary gear system is relatively complicated and complex and therefore expensive.

Finally, the single or multistage planetary gear system provides a more or less large reduction of the rotational movement. However, this must be converted by a spindle into a translational movement.

German published patent application 4,229,042 discloses one such brake actuator which is provided with an electric motor and a threaded spindle. The threaded spindle is driven by the motor and a spindle nut is in contact engagement with a first hydraulic piston connected to a hydraulic chamber. A second hydraulic piston can operate on a friction lining for the purpose of carrying out a braking operation.

Such a brake actuator would require an over-sized electric motor as a power source notwithstanding a certain force transmission via the hydraulics. For this reason, to achieve an adequate transmission of the torque generated by the motor, additional transmissions are used in all of the embodiments described in the above-mentioned German published patent application 4,229,042. The transmissions are connected between the motor and converting device. In total, and especially because of the multiple stages, such a brake actuator is complex and is therefore not only expensive to manufacture but is also subject to malfunction in operation.

A further number of suggestions for assembling a compact electrically actuable brake actuator are known. However, none of these solutions have been able to develop the forces required to actuate a brake from the rotational movement of the drive motor in only one gearing stage.

SUMMARY OF THE INVENTION

It is an object of the invention to directly generate the forces which are needed to apply to a brake while using a spindle direct drive without additional gearing stages or without further components.

The brake actuator of the invention is for an electrically actuable vehicle brake having a brake disc. The brake actuator includes: a frame; an electric motor mounted in the frame; a brake piston defining a longitudinal axis and being movably mounted so as to be displaceable along the axis relative to the frame; a brake pad mounted on the brake piston for coacting with the brake disc; a spindle assembly for operatively connecting the electric motor to the brake piston to displace the brake piston along the axis to bring the brake shoe into and out of contact engagement with the brake disc; the spindle assembly including a spindle rod having a fine thread formed thereon and a spindle nut; the spindle nut including a housing and a plurality of cylindrical rollers mounted between the spindle rod and the housing; each of the cylindrical rollers having a peripheral profile formed therein for engaging the fine thread of the spindle rod; and, a coupling mechanism for coupling the rollers to the housing.

The use of a planetary-roller spindle assembly for converting a rapid rotational movement of an electric motor into a slow axial movement of a friction lining in an electrically actuable brake actuator makes the force transformation possible with only a single gearing stage.

The planetary roller bearing has a very low coefficient of friction. Notwithstanding the use of rollers, the effective pitch of the spindle system can be selected to be very low. In this way, a correspondingly large force transformation is achieved.

The application of planetary-roller spindle assemblies for converting a rotational movement into an axial movement is disclosed, for example, in U.S. Pat. No. 4,926,708 incorporated herein by reference. New possibilities for force transformation have been discovered by introducing this gear technology to various areas. For example, the requirement for a spindle system with very low pitch and a correspondingly high precision can be realized with such planetary-roller spindle assemblies. This requirement is, for example, present in robot applications.

With the invention, the gearing technology of the planetary-roller spindle assembly is applied for the first time to the transmission of the braking force from an electric motor to a friction lining of a brake actuator of an electrically actuable vehicle brake.

A compact electric motor is used to drive the brake and is characterized by low weight and small structural volume. For this reason, the electric motor can be mounted directly at the wheel brake. In a first embodiment, the rotor of the electric motor is fixedly connected to the spindle rod of the planetary-roller spindle assembly so that the spindle rod rotates with the rotor. The spindle nut is secured against rotation and is directly connected to the actuating piston of the brake. This piston presses the friction lining against the brake disc.

The planetary-roller spindle assembly permits a very low effective pitch to be realized which is unobtainable with other spindle types. Accordingly, pitches, for example, in the region of 0.1 mm can be realized. In this way, this one transformation stage can convert the limited torque of the drive motor into an adequate longitudinally directed force for engaging the brake.

A special advantage of the actuator of the invention is that the adjustment required to compensate for wear can be realized in a simple manner. The desired adjustment path can be provided simply as an additional displacement path on the spindle rod.

According to another feature of the invention, the rotor of the electric motor is connected to the spindle nut so that the nut rotates with the rotor. The spindle rod then operates on the brake piston. According to still another feature of the invention, the rotor of the electric motor has an inner bore which accommodates the spindle rod and permits an adjusting movement. With this embodiment, the structural length of the brake actuator is reduced because the movement required for readjustment is shifted into the region of the electric motor.

Overall, the brake actuator according to the invention is characterized by a compact light construction and has only a few components. The brake actuator has a high efficiency because of the low friction losses.

BRIEF DESCRIPTION OF THE DRAWINGS

The invention will now be described with reference to the drawings wherein:

FIG. 2 is a section view of the planetary-roller spindle assembly of the brake actuator and is taken along line A-A' of FIG. 1;

FIG. 3 is an enlarged view of detail B of FIGS. 1 and 4; and,

DESCRIPTION OF THE PREFERRED EMBODIMENTS OF THE INVENTION

Figure 1:
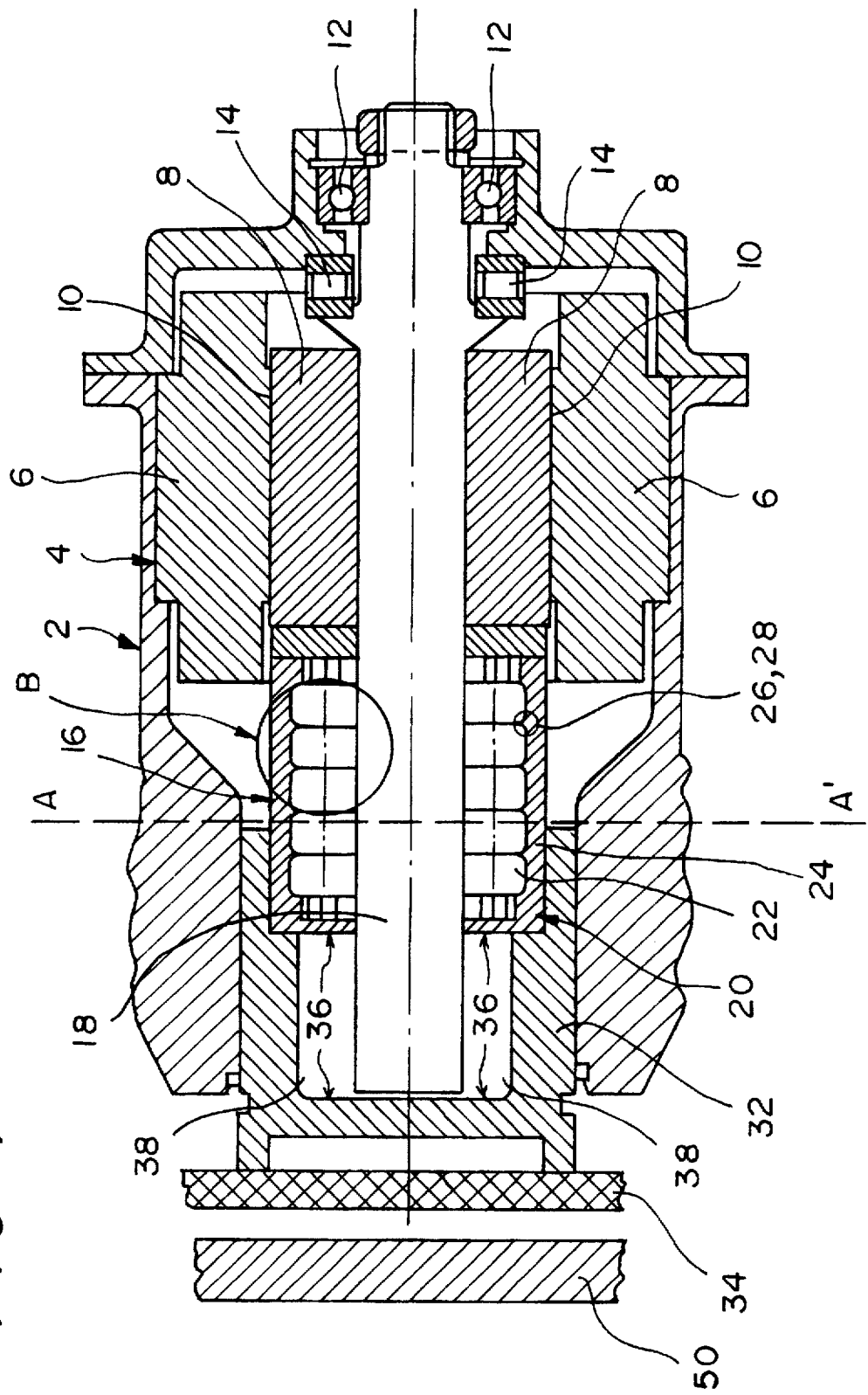
FIG. 1 is a longitudinal section view of a first embodiment of the brake actuator of the invention.

FIG. 1 shows a complete brake actuator 2 having an electric motor 4 and a brake lining (friction lining) 34. The electric motor 4 comprises stator 6 and a rotor 8 and an air gap 10 disposed therebetween. The electric motor 4 is operatively connected to the brake lining 34 via a planetary-roller spindle assembly 16. Because of the bearings and mounting of the components, the spindle rod 18 is driven in this embodiment and not the spindle nut 20. The spindle rod 18 is fixedly connected to the rotor 8 of the motor 4 so as to rotate therewith. The spindle rod 18 defines the rotational axis of the electric motor 4. At the rearward end, the spindle rod 18 is supported by a radial bearing 12 and by a thrust bearing 14. The thrust bearing is a self-aligning or barrel-shaped roller bearing. This support is required because all of the axial forces which are transmitted from the motor 4 must be supported.

The operation of the brake actuator 2 will now be described.

The spindle assembly 16 is driven by the electric motor 4 and the nut 20 including the brake lining 34 are moved forwardly or rearwardly. The nut 20, which is mounted so that it cannot rotate, and the brake lining 34 are attached to the brake piston 32. When wear has taken place, for example, on the brake lining 34, or for a precise adjustment of the air gap of the brake, the spindle rod 18 can be adjusted by an amount corresponding to an adjustment path 36 of about 25 mm relative to the brake piston 32 in a hollow space 38. Thus, adjustment can be achieved by causing the spindle 18 to rotate, for example, one or two revolutions less when disengaging the brake lining 34 from the brake disc. This leads to the condition that housing 24 of the spindle assembly 16 does not return completely to the previous start position, that is, a new start position is established. When the brake piston 32 is driven out again with the next braking operation, the spindle will rotate to move the brake piston toward the brake disc 50 the same amount as previously but from the readjusted or new start position thereby compensating for wear of the brake lining 34. This readjustment can be repeated until the path 36 has been used up.

The stroke of the brake piston 32 including the brake lining 34 can amount to approximately 1 mm in response to hard braking.

The spindle assembly 16 comprises a spindle rod 18 with a spindle nut 20 threadably engaged therewith so as to permit relative movement therebetween. The spindle rod 18 here is surrounded by a plurality of cylindrical rollers 22 each having a peripheral profile 31. The cylindrical rollers 22 are mounted within the spindle nut 20 and are disposed between the spindle rod 18 and the housing 24 of the spindle nut 20.

For holding and journalling, these cylindrical rollers 22 and the interior surface of the housing 24 are provided with a system of coarse grooves 26 and corresponding annular projections 28 as shown in FIG. 3. These coarse grooves 26 and the projections 28 have no pitch and are instead arranged concentrically. The fine peripheral profile 31 corresponds to the fine thread 30 and can be configured to have a pitch. However, the peripheral profile 31 can also be configured not to have a pitch.

Whereas the rollers 22 roll on the fine thread 30 of the spindle rod 18, the rollers 22 do not on their outer sides roll on the fine thread 30; instead, the rollers 22 roll with their coarse grooves 26 on the annular projections 28 located on the inner side of the spindle nut housing 24. The projections (or teeth) 28 on the inner side of the spindle nut housing 24 function to guide the cylindrical rollers 22. The annular teeth 28 engage in respective ones of the concentric grooves 26 formed in the periphery of the cylindrical rollers 22. In this way, there is no axial movement between the rollers 22 and the housing 24 of the spindle nut. Each of the cylindrical rollers 22 is configured as a single elongated piece extending along most of the length of housing 24.

Referring to FIG. 3, the spacing shown between fine thread 30 of the spindle and profile 31 of roller 22 is provided for the sake of clarity. The thread 30 and profile 31 are in firm contact engagement with each other. Likewise, the teeth 28 and grooves 26 are in firm mutual contact engagement. In this connection, reference may be made to U.S. Pat. No. 4,926,708, incorporated herein by reference, which shows a planetary-roller spindle assembly of the kind described above.

The effective radius between the cylindrical rollers 22 and the spindle rod 18 is not identical to the effective radius between the cylindrical rollers 22 and the housing 24 of the spindle nut 20. For this reason, an additional degree of freedom is provided for the transformation ratio to be achieved. The resulting transformation is provided by the fineness of the pitch of the spindle thread; however, the transformation could also be realized by a thread pitch of zero by considering the geometry to be selected for the rollers 22.

Figure 4:
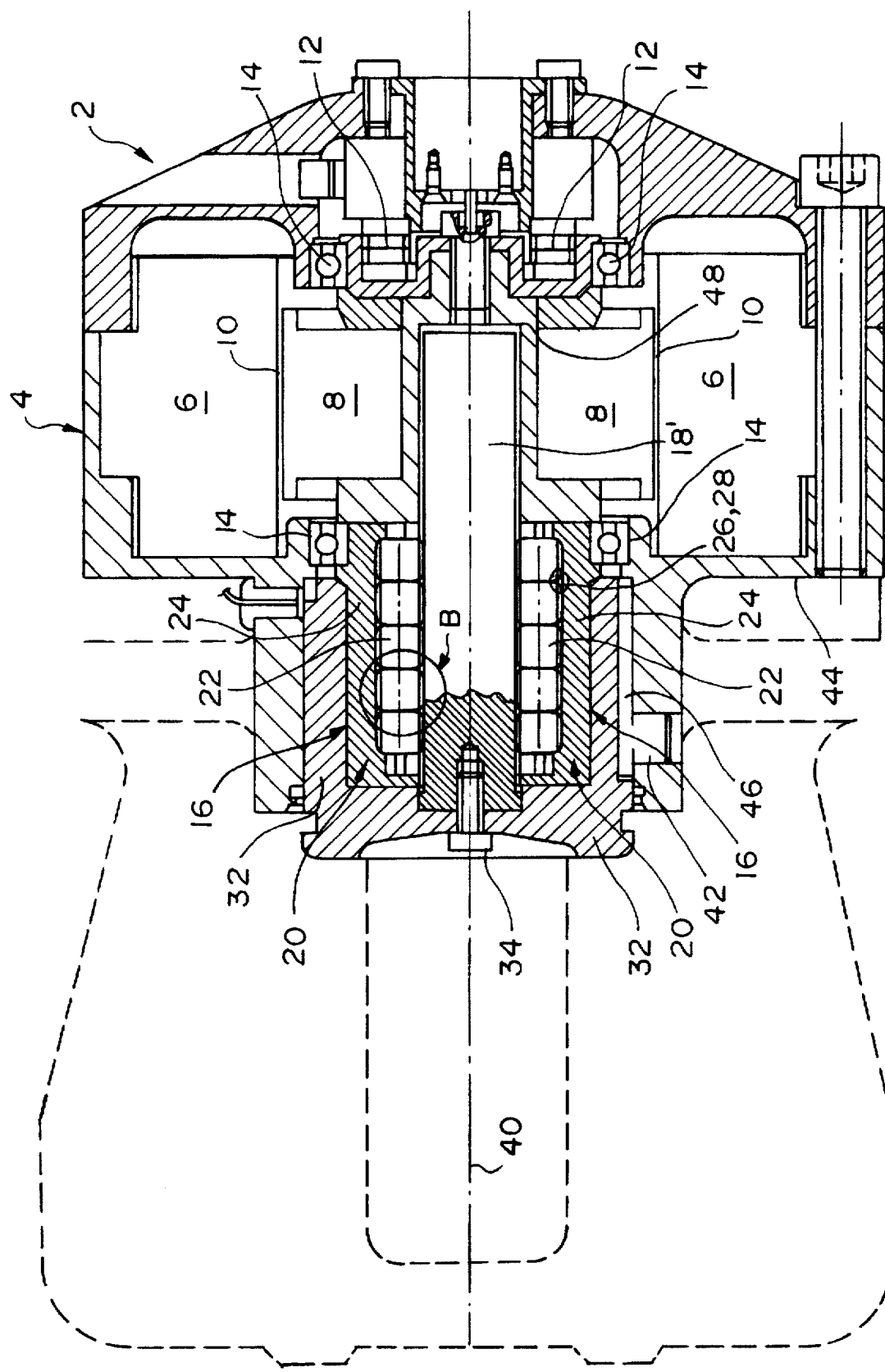
FIG. 4 is a longitudinal section view taken through a second embodiment of the brake actuator of the invention.

The second embodiment of the brake actuator 2 according to the invention is shown in FIG. 4 and likewise includes an electric motor 4 and a brake piston 32 provided with a brake lining (not shown in FIG. 4). The electric motor 4 comprises a stator 6 and a rotor 8. The brake piston 32 is fixedly attached to the spindle rod 18' by threaded bolt 34. The electric motor 4 is operatively connected to the brake piston 32 via a planetary-roller spindle assembly 16. In this embodiment however, it is not the spindle rod 18' which is driven by rotor 8 of the motor 4 but the spindle nut 20.

The spindle nut 20 is fixedly attached to the rotor 8 of the motor 4 so that it rotates therewith causing the rollers 22 to rotate therewith because of the force-tight contact of projections 28 against the walls of grooves 26 thereby, in turn, causing the spindle rod 18' to move axially as the rotor 8 and rollers 22 rotate. The rotor 8 of the motor 4 is provided with an axial cavity 48 to accommodate the spindle rod 18' therein. The rotor 8 and the spindle nut 20 are supported by radial bearings 14 and by a thrust bearing 12 at the rearward end of the rotor.

The spindle nut 20 is driven in rotation by the rotor 8 of the motor 4 to actuate the brake actuator 2. The spindle rod 18' and the brake piston 32 are held so that they cannot rotate. The brake piston 32 is prevented from rotating by a key 42 fixed in the motor frame 44. The key 42 extends into a longitudinal slot 46 formed in the wall of the brake piston 32 thereby permitting movement of the piston in the direction of the longitudinal axis 40. The spindle rod 18', the brake piston 32 and the brake lining attached to the brake piston 32 are all moved forwardly or rearwardly in the direction of the longitudinal axis 40 of the spindle rod 18' by the rotation of the spindle nut 20.

In a manner similar to that shown for the embodiment of FIG. 1, the spindle nut 20 can be adjusted relative to the brake piston 32 by an adjustment path of approximately 25 mm when there is wear of the brake lining or to provide a more precise adjustment of the air gap of the brake.

The stroke of the brake piston 32 is about 1 mm in response to hard braking.

In a manner similar to the embodiment of FIG. 1, the spindle 16 comprises the spindle rod 18' with the spindle nut 20 arranged thereon. Here too, the spindle rod 18' is surrounded by a plurality of cylindrical rollers 22 each having a peripheral profile 31 formed therein. The cylindrical rollers 22 are disposed within the spindle nut 20 and are positioned between the spindle rod 18' and the housing 24 of the spindle nut 20 as shown in FIG. 3.

For holding and journalling, the cylindrical rollers 22 and the interior surface of the housing 24 of the spindle nut 20 are provided with a system of coarse grooves 26 and corresponding annular projections 28 as shown in FIG. 3. Here too, the coarse grooves 26 and the projections 28 have no pitch and are instead arranged concentrically. The fine peripheral profile 31 corresponds to the fine thread 30 and can be configured to have a pitch. The peripheral profile 31 can also be configured not to have a pitch.

As the rotor 8 and the spindle unit 20 rotate, there is a force-tight contact connection between projections 28 against the walls of grooves 26 which causes the rollers 22 to rotate therewith thereby, in turn, causing the spindle rod 18' to move axially.

Here too, the operation of the planetary-roller spindle assembly corresponds to the operation of the same assembly in the first embodiment. The planetary-roller spindle assembly per se is shown in U.S. Pat. No. 4,926,708 referred to above and incorporated herein by reference.

It is understood that the foregoing description is that of the preferred embodiments of the invention and that various changes and modifications may be made thereto without departing from the spirit and scope of the invention as defined in the appended claims.

What is claimed is:

1. A brake actuator for an electrically actuable vehicle brake having a brake disc, the brake actuator comprising:

a frame;

an electric motor mounted in said frame;

a brake piston defining a longitudinal axis and being movably mounted so as to be displaceable along said axis relative to said frame;

a brake pad mounted on said brake piston for coacting with said brake disc;

a spindle assembly for operatively connecting said electric motor to said brake piston to displace said brake piston along said axis to bring said brake pad into and out of contact engagement with said brake disc;

said spindle assembly including a spindle rod having a fine thread formed thereon and a spindle nut;

said spindle nut including a housing and a plurality of cylindrical rollers mounted between said spindle rod and said housing;

each of said cylindrical rollers having a peripheral profile formed therein for engaging said fine thread of said spindle rod;

a coupling mechanism for coupling said rollers to said housing;

said housing having an inner wall surface; said coupling mechanism including a plurality of annular projections formed on said inner wall surface;

each of said cylindrical rollers having a plurality of annular grooves formed therein for engaging corresponding ones of said annular projections;

said motor having a stator and a rotor rotatable mounted in said stator; and, one of said spindle nut and said spindle rod being directly connected to said rotor so as to rotate therewith.

2. The brake actuator of claim 1, said spindle rod being a longitudinal extension of said rotor.

3. The brake actuator of claim 1, said spindle rod being fixedly connected directly to said rotor so as to rotate therewith; said brake piston being fixedly mounted to said spindle nut so as to constitute a unit therewith; and, means for preventing said brake piston from rotating relative to said frame.

4. The brake actuator of claim 3, wherein said unit is mounted in said frame to move linearly along said longitudinal axis when said spindle rod is rotated; said brake piston having a hollow space formed therein for accommodating said spindle rod when said unit is moved; and, said hollow space having a length measured along said longitudinal axis with said length corresponding to an adjustment path for facilitating an adjustment of said brake pad vis-a-vis said brake disc.

5. The brake actuator of claim 1, said spindle nut being fixedly connected directly to said rotor so as to rotate therewith and impart a linear movement along said axis to said spindle rod; and, said brake piston being fixedly mounted on said spindle rod.

6. The brake actuator of claim 5, said rotor having a cavity formed therein for accommodating said spindle rod and for facilitating an adjustment of said brake pad vis-a-vis said brake disc.

7. The brake actuator of claim 1, wherein said rotor defines a rotational axis and said spindle rod defines a longitudinal axis coincident with said rotational axis.

* * * * *

UNITED STATES PATENT AND TRADEMARK OFFICE
CERTIFICATE OF CORRECTION

PATENT NO. : 5,788,023
DATED : August 4, 1998
INVENTOR(S) : Schoner et al.

It is certified that error appears in the above-identified patent and that said Letters Patent is hereby corrected as shown below:

On the Title page, [73]: delete "Daimeler-Benz" and substitute -- Daimler-Benz -- therefor.

In column 1, line 49: delete "is. Then, however" and substitute -- is then, however, -- therefor.

Signed and Sealed this

Fifteenth Day of December, 1998

Attest:

BRUCE LEHMAN

Attesting Officer

Commissioner of Patents and Trademarks